US009021387B2

(12) United States Patent
Ikeda

(10) Patent No.: US 9,021,387 B2
(45) Date of Patent: Apr. 28, 2015

(54) RE-SIZING USER INTERFACE OBJECT ON TOUCH SENSITIVE DISPLAY

(75) Inventor: Akihiko Ikeda, Taipei (TW)

(73) Assignee: Hewlett-Packard Development Company, L.P., Houston, TX (US)

( * ) Notice: Subject to any disclaimer, the term of this patent is extended or adjusted under 35 U.S.C. 154(b) by 164 days.

(21) Appl. No.: 13/562,677

(22) Filed: Jul. 31, 2012

(65) Prior Publication Data
US 2014/0040820 A1 Feb. 6, 2014

(51) Int. Cl.
G06F 3/048 (2013.01)
G06F 3/033 (2013.01)
G06G 3/00 (2006.01)
G06F 3/0488 (2013.01)

(52) U.S. Cl.
CPC .. *G06F 3/04883* (2013.01); *G06F 2203/04806* (2013.01); *G06F 2203/04808* (2013.01)

(58) Field of Classification Search
USPC .......................................... 715/800, 716, 863
See application file for complete search history.

(56) References Cited

U.S. PATENT DOCUMENTS

| 8,134,538 | B2 * | 3/2012 | Nakayama .................... 345/173 |
| 8,184,102 | B2 | 5/2012 | Park et al. |
| 8,365,090 | B2 | 1/2013 | Ording |
| 2006/0077183 | A1 * | 4/2006 | Studt ............................. 345/173 |
| 2007/0236478 | A1 * | 10/2007 | Geaghan et al. .............. 345/173 |
| 2007/0262964 | A1 | 11/2007 | Zotov et al. |
| 2009/0070705 | A1 | 3/2009 | Ording |
| 2010/0045666 | A1 | 2/2010 | Kornmann et al. |
| 2011/0181528 | A1 | 7/2011 | Capela et al. |

OTHER PUBLICATIONS

"Nextwindow's Multi-touch Overview", http://www.nextwindow.com/pdf/nextwindow_multitouch.pdf, Copyright NextWindow 2007, v1.2.
Lestat611 et al., "Can you connect a normal mouse to a touchscreen PC?," 2010, lockergnome.net, >http://lockergnome.net/questions/106394/can-you-connect-a-normal-mouse-to-a-touchscreen-pc≤.

* cited by examiner

*Primary Examiner* — David Phantana Angkool
(74) *Attorney, Agent, or Firm* — Hewlett-Packard Patent Department

(57) ABSTRACT

A resizable user interface object on a touch sensitive display is resized based on detection of first and second contacts at first and second locations on the touch sensitive display. The object is resized based on detection of relative movement of the first and second contacts.

20 Claims, 14 Drawing Sheets

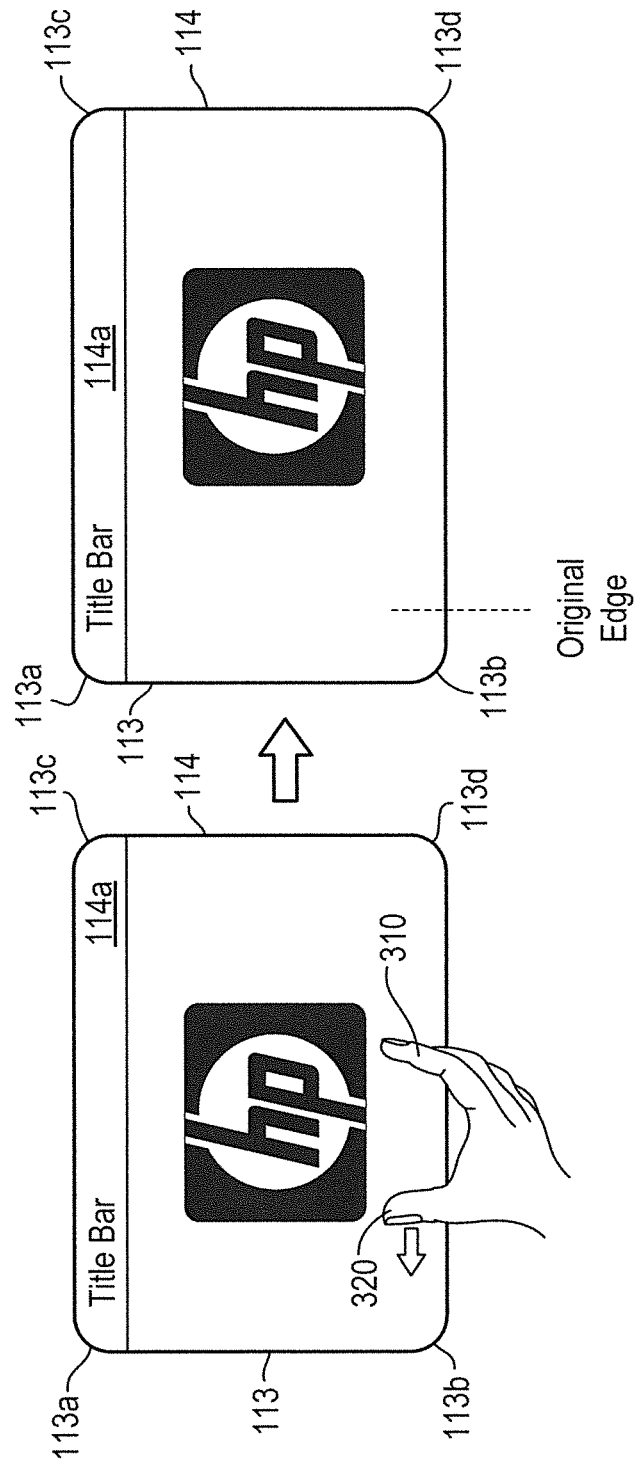

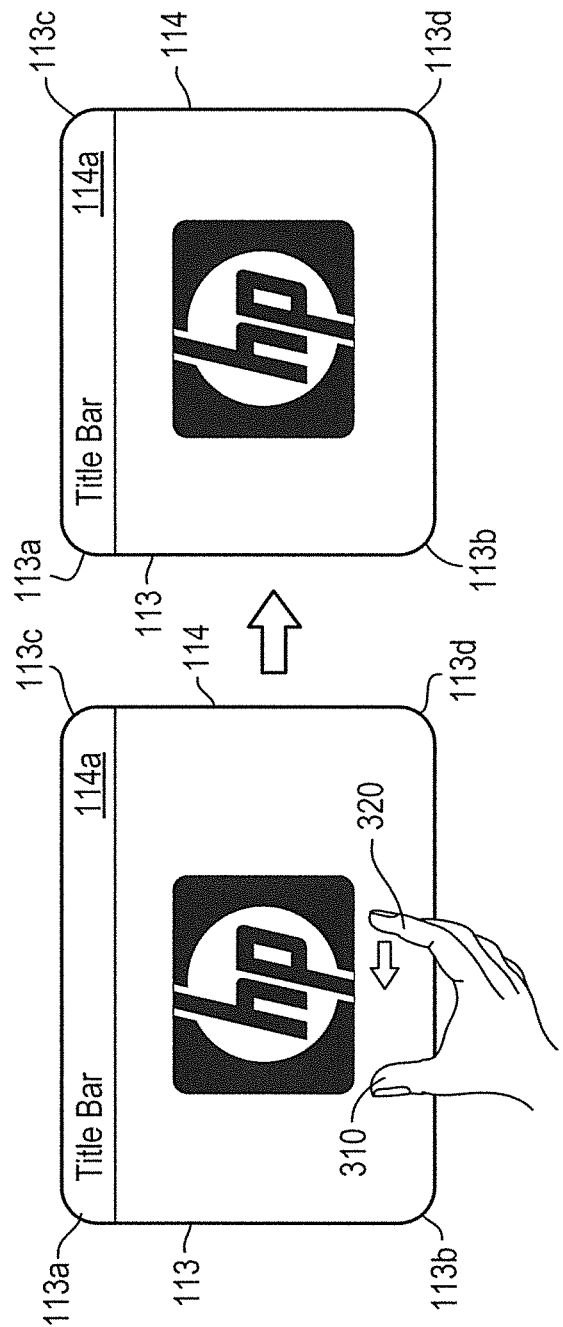

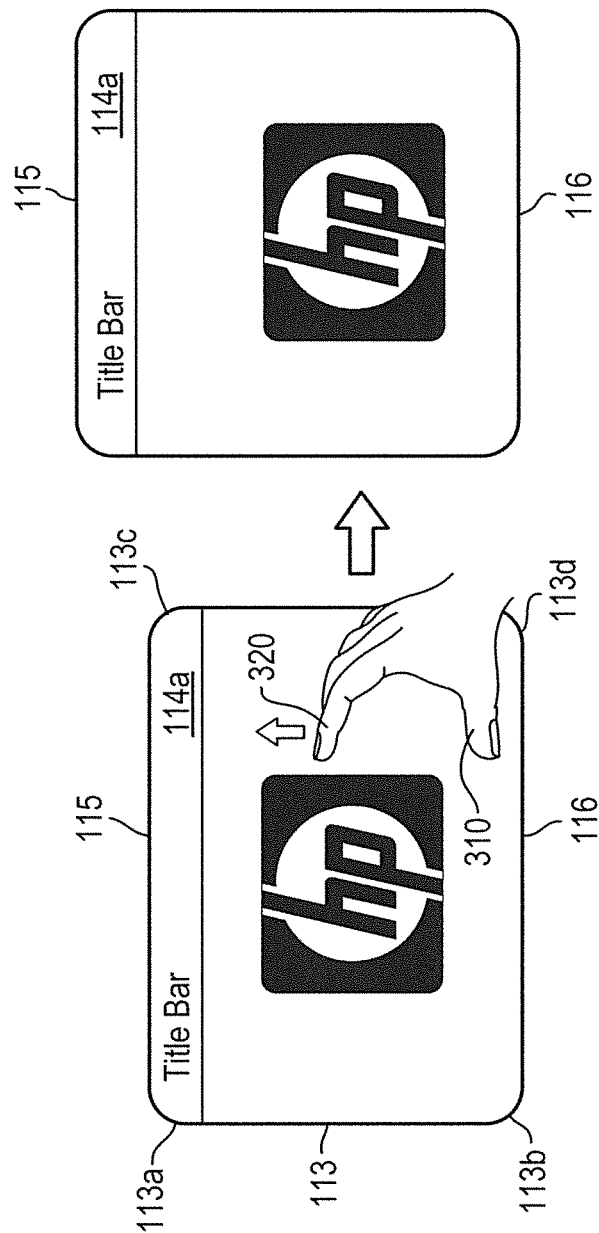

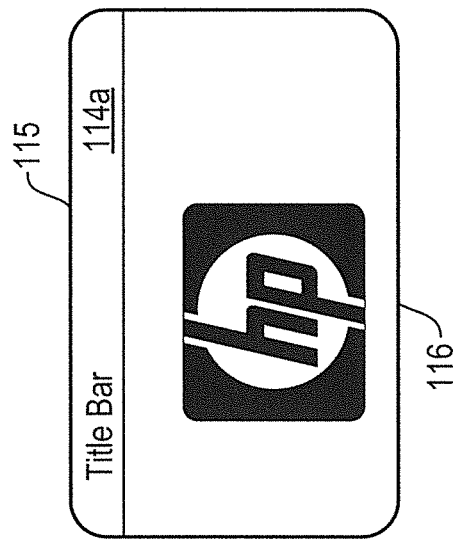
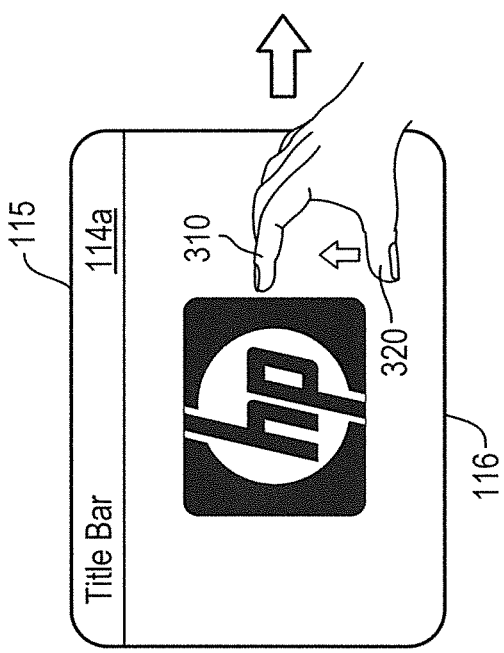

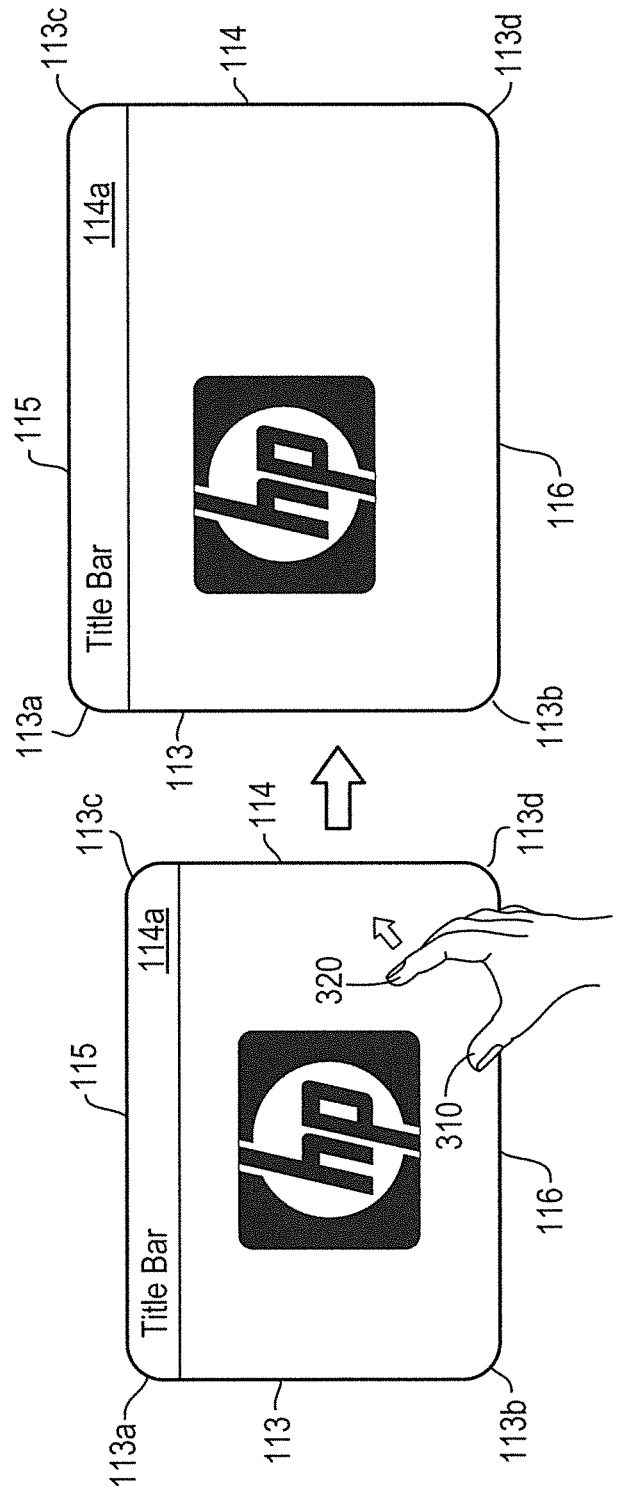

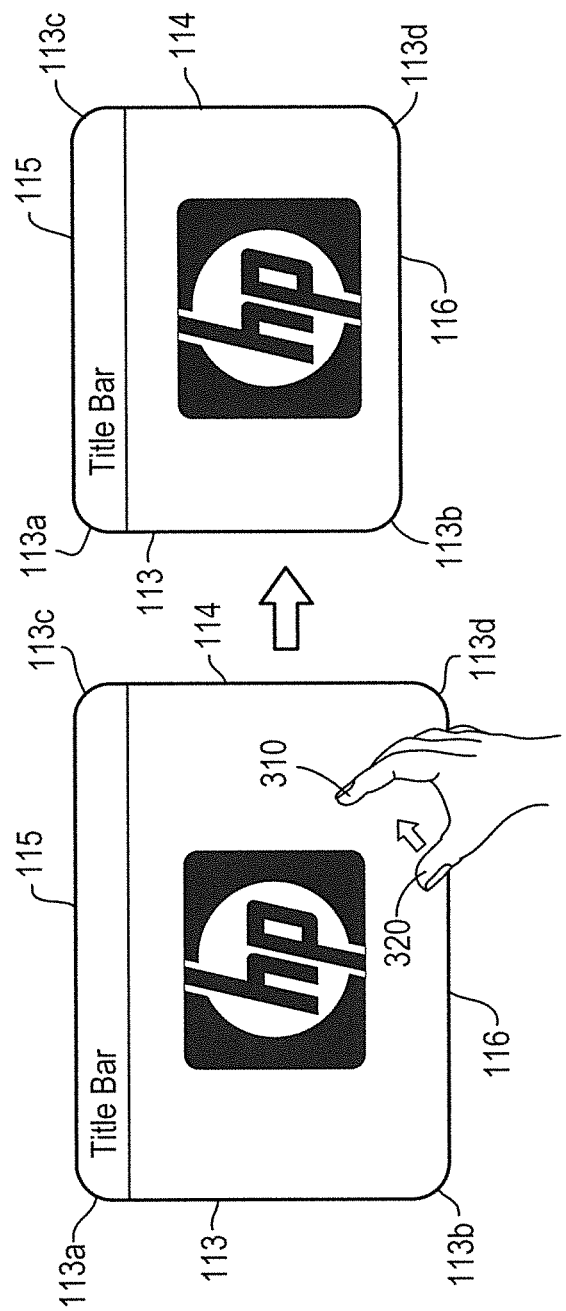

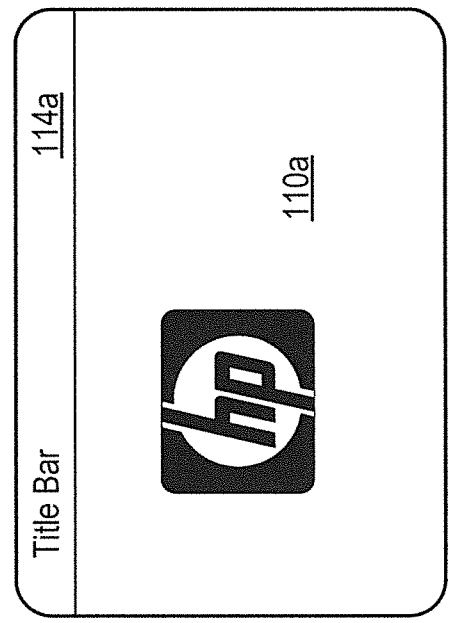
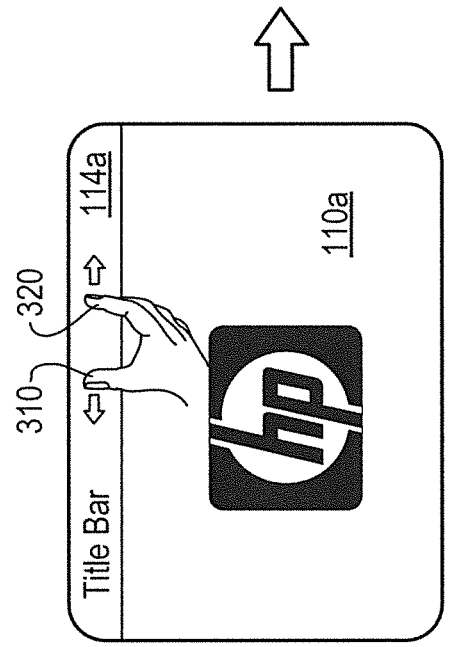
Fig. 6B
Fig. 6A

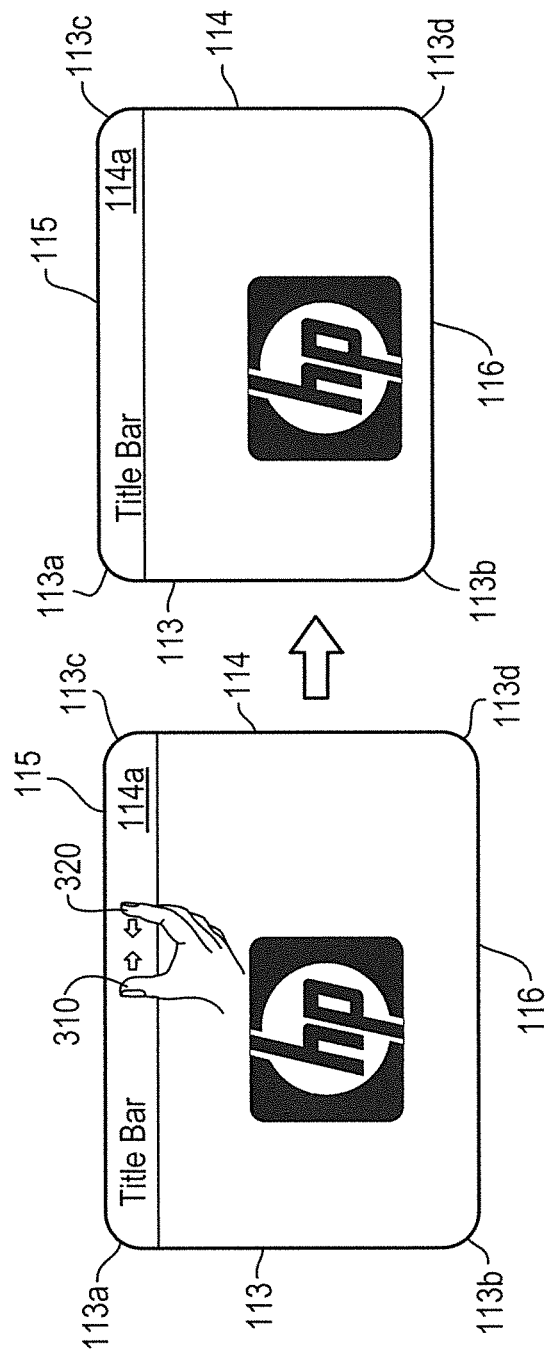

RE-SIZING USER INTERFACE OBJECT ON TOUCH SENSITIVE DISPLAY

BACKGROUND

As interaction between users and computer devices continues to develop, new ways of facilitating user input have been developed. In recent years touch sensitive displays have become increasing popular. A touch sensitive display is able to detect the presence and movement of a finger or stylus on a surface of the display and it is thus possible for a user to interact with a graphical user interface by a series of hand gestures.

BRIEF DESCRIPTION OF THE DRAWINGS

Examples of the present disclosure will now be described, by way of non-limiting example only, with reference to the accompanying drawings, in which:

FIGS. 3A to 3N show examples of a user interface object being resized;

FIGS. 6A to 6D is show examples of a user interface object being resized according to the method of FIG. 5.

DETAILED DESCRIPTION

Figure 1:
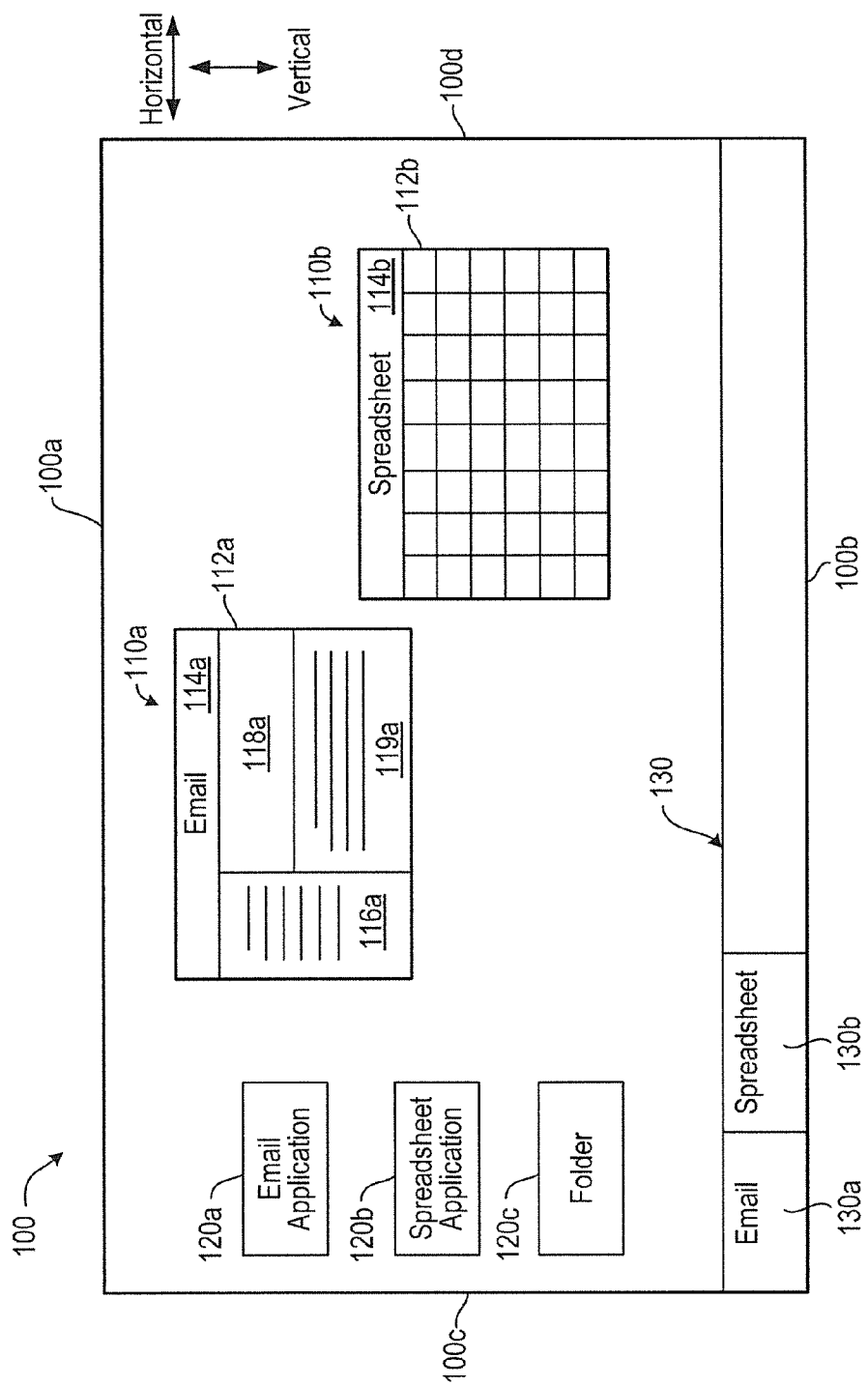
FIG. 1 shows an example of a graphical user interface on a display.

FIG. 1 shows an example of a graphical user interface environment displayed on a touch sensitive display 100 of a computing device. The touch sensitive display may for example use LCD (liquid crystal display), LED (light emitting diode), LPD (liquid polymer display), E-Ink (electrophoretic ink) or any other suitable display technology. The touch sensitive display is able to detect the presence of a contact (such as a finger, stylus or other object) on a part of its surface and may employ any of a plurality of touch sensing technologies to do so, for example but not limited to capacitive, resistive, surface acoustic wave, infrared, magnetic field intensity detection systems which detect the presence and location of a contact on the display. The computing device may for example be a mobile computing device such as a tablet computer, mobile phone, PDA, or computing device which is usually kept in one location such as a computer monitor, television or printer, or any other type of electronic device having a touch sensitive display.

A user interface object is any graphical element in the graphical user interface environment with which the user may interact. Some user interface objects may be resizable. The following description focuses on an example where the resizable graphical user element is an application window. However the resizable user interface object is not limited thereto and may be any other object which may be resized, e.g. a text box, table, chart diagram, picture, photograph, page, document etc.

Referring now to FIG. 1 in more detail, the graphical user interface comprises a plurality of graphical user interface objects 110a, 110b, 120a, 120b, 120c and 130. The graphical user interface has a horizontal axis and vertical axis as shown by the arrows in FIG. 1. Generally the vertical axis will be from the top 100a to the bottom 100b of the display, while the horizontal axis will be from the left side 100c to the right side 100d. The top and bottom of the display can be determined with reference to the orientation in which the user interface objects are the 'right way up', e.g. any text labeling the objects is the 'right way up' such that it can be easily read.

User interface objects 110a and 110b are re-sizable application windows corresponding to an email application and a spreadsheet application respectively. Each application window has a boundary 112a, 112b such as a frame, denoting the limits of the window, and a title bar 114a, 114b. The application running in each application window may have sub elements, or further user interface objects, which the user can interact with. For example the email application has a folder list 116a, a pane with a list of email messages 118a in the selected folder, and a preview 119a of a selected email message.

Referring now to the other user interface objects shown in FIG. 1; 120a, 120b and 120c are icons corresponding respectively to an email application, spreadsheet application and a folder containing saved files. The user may interact with these icons, e.g. by a double or single tap, to open an application, folder or initiate some other action. User interface object 130 is a taskbar and includes buttons 130a and 130b corresponding to the currently running applications, in this case the email application and spreadsheet application respectively.

The user may wish to resize one of the user interface objects, for instance to inspect the contents in more detail or to make room for other objects on the display. In the present example, only the application windows are resizable. The icons, the taskbar and buttons in the taskbar are not re-sizable.

In other examples, some of the other user interface objects may be resizable. For instance the tool bar may be resizable in at least one direction. In still further examples, the application windows themselves may contain re-sizable elements, for instance the relative size of the panes 116a, 118a and 119a may be varied.

Figure 2:
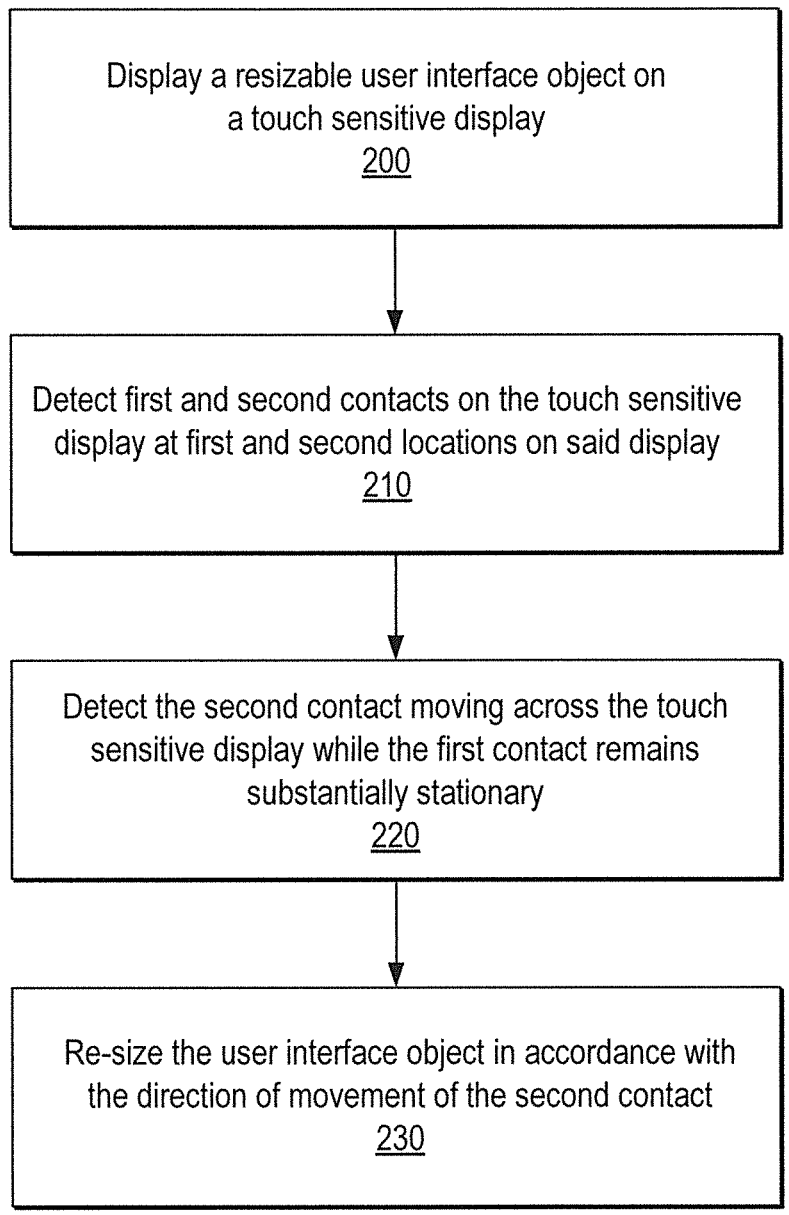
FIG. 2 is a flow chart of a method of resizing a user interface object according to one example.

FIG. 2 is a flow diagram showing an example method of re-sizing a user interface object displayed on the touch sensitive display. At 200 a resizable user interface object (e.g. an application window) is displayed on the touch sensitive display.

At 210 first and second contacts (e.g. thumb or finger contacts) are detected on the touch sensitive display at first and second locations on the touch sensitive display within the displayed user interface object.

At 220 the touch detection systems detects movement of the second contact across the touch sensitive display, while detecting that the first contact remains substantially stationary. At 230, in response to the gestures detected at 220, the user interface object is resized in accordance with the detected direction of movement of the second contact.

For instance, if the second contact is detected to move towards the first contact, then the user interface object may be made smaller. On the other hand if the second contact is detected to move away from the first contact, then the user interface object may be made bigger.

In one possible implementation of the above example, at block 210, the first and second contacts may be detected at any 'arbitrary' area within the user interface object. That is, it is not necessary for either of the contacts to be at a specific location such as a special "re-sizing handle" of the object. Indeed in many implementations the object may not have any re-sizing handles. Rather, the user may initiate the contacts at any convenient area within the user interface object. In some implementations the area may be any area other than the title bar 114*a*. In some implementations the area may be any area other than the boundary 112*a* of the object, or any area other than the boundary 112*a* and the title bar 114*a*.

The direction of the resizing depends upon the direction of the movement of the second contact. There are many possibilities, which depend on the configuration of the method. In one example if the direction of movement is substantially horizontal, or within a predetermined angle of the horizontal, the re-sizing may be in the horizontal direction. In one example, a side or corner of the user interface object, located nearer to the first contact than the second contact, is kept stationary during the resizing (i.e. the resizing is about a corner or an edge of the object, rather than about the center of the object). More specific examples will now be described with reference to FIGS. 3A to 3N.

Figures 3A, 3B:
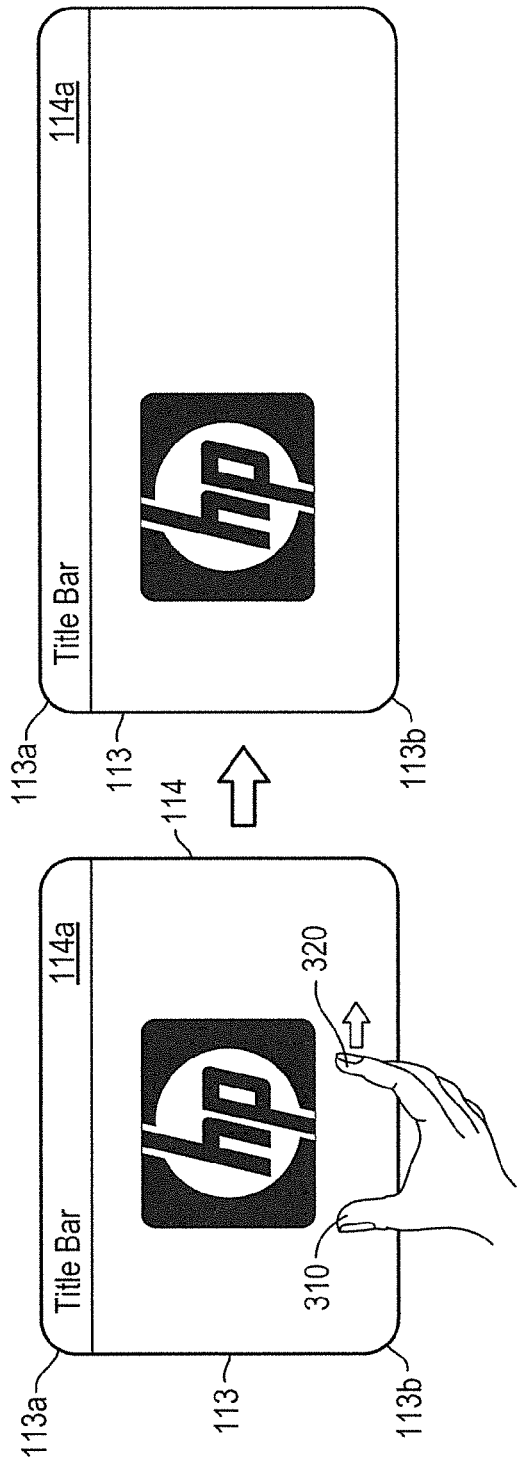

FIG. 3A shows one example of a re-sizing operation in which the object is resized horizontally. As mentioned above the "horizontal" direction may be determined with reference to the title bar (e.g. parallel thereto) if there is one, or as the left to right or right to left direction of the display it its proper orientation in which the user interface objects are the 'right way up', e.g. such that any text labeling the graphical user objects displays in the correct easily read orientation.

A first contact 310 is detected to be substantially stationary, while a second contact 320 is detected to move away from the first contact in a generally horizontal direction (by "generally" horizontal it is meant within a predetermined angle of the horizontal). In response to detecting this gesture, the user interface object is resized horizontally such that the edge 113 and corners 113*a* and 113*b* are kept stationary, while the opposite edge 114 is expanded in the direction of movement of the second contact. The resulting resized user interface object is shown in FIG. 3B.

FIG. 3C shows an example in which the resizing operation is the opposite to that shown in FIG. 3D. A first contact 310 and second contact 320 are detected within the resizable user interface object and the second contact 320 moves away from the first contact 310 in the horizontal direction towards the left side. In this case the side 114 is stationary (as are its corners 113*c* and 113*d*), while the left side 113 is expanded in the direction of movement of the second contact. The resized object is shown in FIG. 3D, in which the dotted line 113' shows the original position of the left side 113.

FIG. 3E shows an example of a resizing operation in which the resizable user interface object is made smaller horizontally in response to the second contact 320 moving towards the first contact 310 in the horizontal direction. The side 113 near the first contact remains stationary during the resizing operation while side 114 moves. The resized object is shown in FIG. 3F. Alternatively, it would be possible to resize the other side by positioning the first (stationary) contact on right and placing the second contact on the left and moving the second contact towards the first contact.

FIG. 3G shows an example in which a graphical user object is made larger in the vertical direction. First contact 310 is detected at a first location nearer to bottom edge 116 of the object than second contact 320 which is detected at a second location. First contact 310 is detected to be substantially stationary while second contact 320 is detected moving generally vertically upwards away from the first contact ("generally vertically" means within a predetermined angle of the vertical). In response to this detection, the object is expanded in the vertical direction, by moving edge 115 upwards while bottom edge 116 remains stationary. The resized object is shown in FIG. 3H. Of course the object could alternatively be enlarged in the opposite direction by placing a first contact nearer to the top edge and a second contact nearer to the bottom edge and moving the second contact downwards away from the first contact.

FIG. 3I shows an example in which a graphical user object is made smaller in the vertical direction. First contact 310 nearer to the top edge 115 of the object is stationary while second contact 320 is near to the bottom edge, but moved upwards towards the first contact. The object is made vertically smaller, by moving edge 116 upwards while top edge 115 remains stationary. The resized object is shown in FIG. 3J. Of course the object could alternatively be made smaller in the opposite direction by placing a first contact nearer to the bottom edge and a second contact nearer to the top edge and moving the second contact downwards towards the first contact.

FIG. 3K shows an example in which a graphical user object is resized both horizontally and vertically. A first contact 310 is detected at a first location while a second contact 320 is detected at a second location. First contact 310 is detected to be substantially stationary while second contact 320 is detected to move away from the first contact in a direction which has both a significant vertical and horizontal component ('significant' means at least a predetermined component in that direction). In response the object is enlarged both horizontally and vertically in accordance with the detected movement of the second contact. As stationary first contact 310 is nearer to corner 113*b* than second contact 320, and contact 320 moves towards the upper right and away from corner 113*b*, corner 113*b* is kept stationary while edges 114 and 115 are expanded upwards and to the right respectively. The resized object is shown in FIG. 3L. Of course by using alternative gestures in different directions with a first contact stationary and a second contact moving, the object could be resized both horizontally and vertically in a different direction to that shown in FIGS. 3K and 3L. For example if the second contact was closer to the corner 113*a* than the first contact and moved away from the first contact towards corner 113*a*, then the object would be resized upwards and to the left.

FIG. 3M shows an example in which a graphical user object is made smaller both horizontally and vertically. A first contact 310 is detected at a first location while a second contact 320 is detected at a second location. First contact 310 is detected to be substantially stationary while second contact 320 is detected to move towards the first contact 310 in a direction which has both a significant vertical and horizontal component ('significant' means at least a predetermined component in that direction). In response the object is made smaller both horizontally and vertically in accordance with the detected movement of the second contact. As stationary first contact 310 is nearer to corner 113*c* than second contact 320, and contact 320 moves towards the upper right and towards corner 113*c*, corner 113*c* is kept stationary while edges 113 and 116 are moved upwards and to the right respectively in order to make the object smaller. The resized object is shown in FIG. 3N. Of course the object could be made smaller in a direction different to that shown in FIGS. 3M and 3M by moving the second contact direction towards the first contact but in a different direction. For example first contact 310 could be placed nearer to corner 113*d* than second contact 320, and second contact 320 could be downwards and to the right towards first contact 310. In that case the object would be resized by moving opposite corner 113*a* inwards towards corner 113*d* which would remain stationary; i.e. edge 113 would move towards the right and edge 115 would move downwards.

Figure 4:
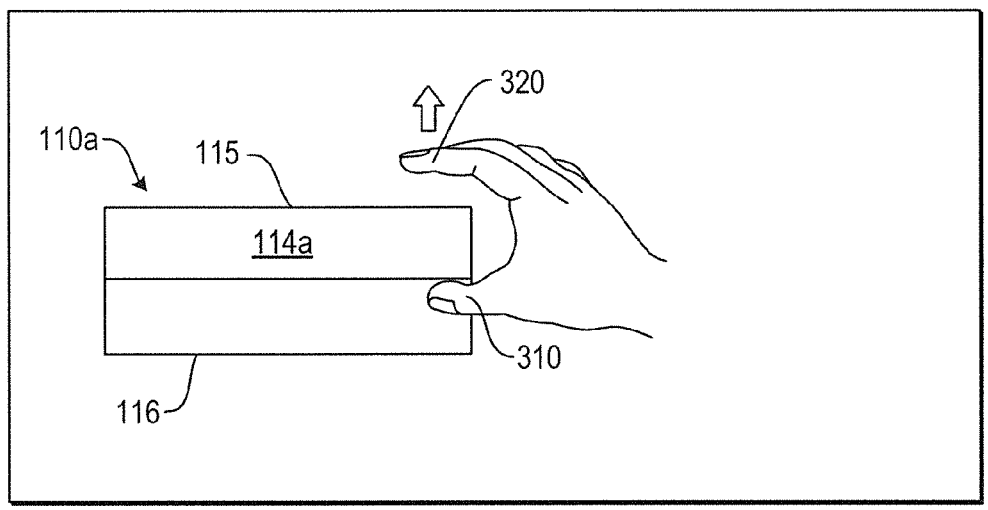
FIG. 4 shows a user interface object being resized according to another example.

The above examples show cases in which both the first and second contacts are at first and second locations within the user interface object. FIG. 4 shows an example in which the second contact is outside the resizable user interface object 110a. This may be useful if the user interface object in its initial state is very small, such that it is difficult to place two contacts within it. The first contact 310 is detected within the object and second contact 320 is detected outside the object. First contact is detected to be stationary, while second contact 320 is detected to move relative to the first contact. In response the object is resized in accordance with the direction of movement of the second contact. Thus, in the illustrated example, the second contact moves upwards away from the first contact and the object is resized vertically upward (edge 116 nearer to the first contact remains stationary, while upper edge 115 nearer to the second contact moves upwards). In other examples the movement could be horizontal or have both horizontal and vertical components in which case the object would be resized accordingly either in the horizontal or both horizontal and vertical directions. Likewise, it would be possible to resize the object vertically downwards by positioning the second contact below the object and moving it downwards away from the object and the first contact. It would also in principle be possible to reduce the size of the object by moving the second contact closer to first contact.

In the example of FIG. 4 the first contact is placed within the resizable user interface object. In many implementations the system may require the first contact to be positioned in the resizable user interface object in order to initiate the resizing operation. However, in an alternative implementation the object may first be selected for resizing by another user input or series of user inputs. In that case the first and second contacts may be at any arbitrary area of the display (or in other cases any arbitrary area not already occupied by a different object) and resizing is conducted when the first contact is detected to be substantially stationary and the second contact is detected moving across the display either towards or away from the first contact.

Figure 5:
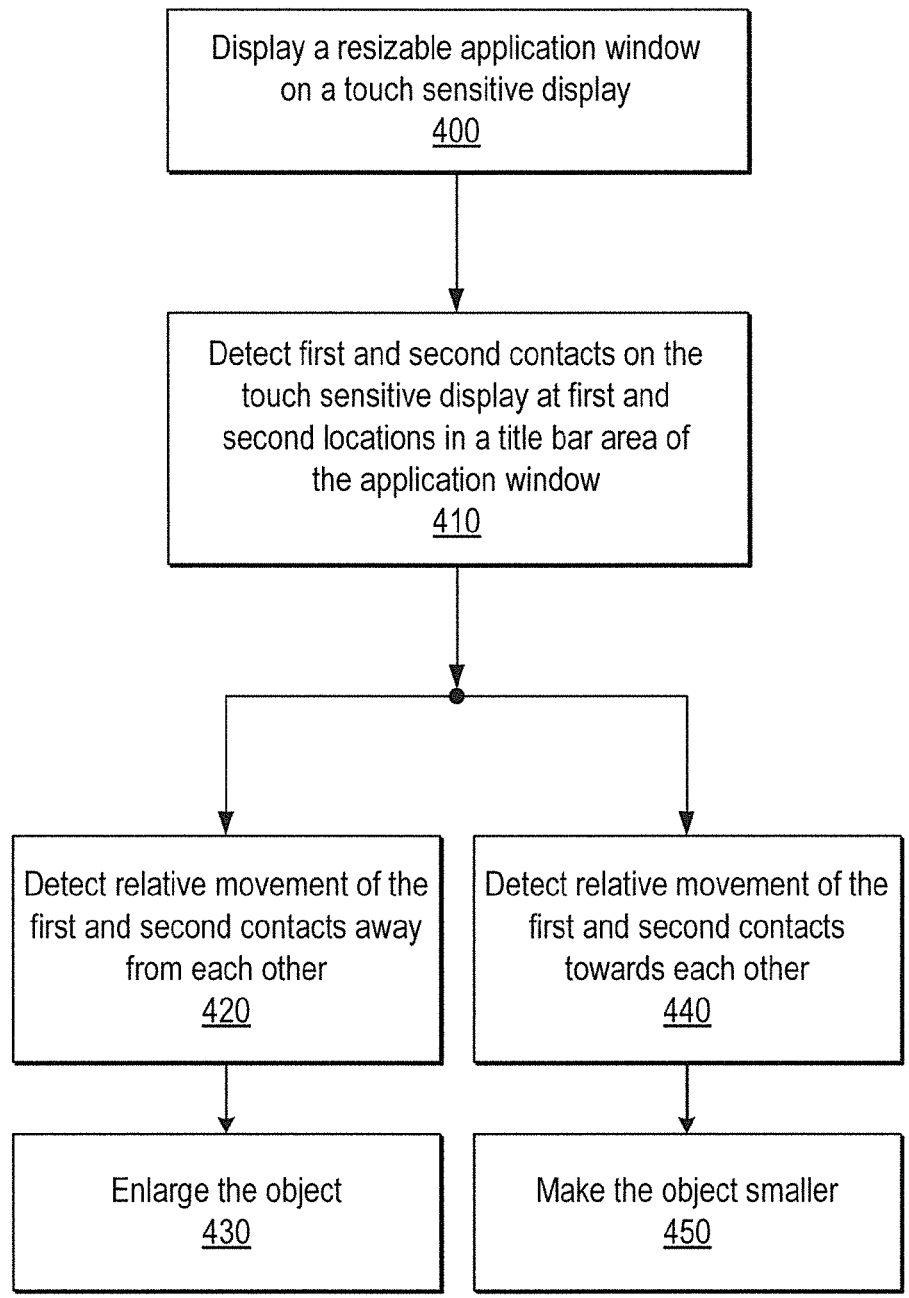
FIG. 5 is a flow chart showing a method of resizing a user interface object according to the example of FIG. 5.

FIG. 5 is a flow diagram showing another example method of re-sizing an application window displayed on the touch sensitive display, in which a particular re-sizing operation is conducted in response to detecting first and second contacts in a title bar area of an application window.

At 400 an application window having a title bar is displayed on the display.

At 410 first and second contacts are detected on the display in the title bar area of the application window.

At 420 relative movement of the first and second contacts is detected, which relative movement causes the distance between the first and second contacts to increase. In some implementations any such relative movement apart may be sufficient, in other implementations it may be required that both the first and the second contacts move, in still other implementations it may be required that the movement is in a particular orientation, e.g. horizontal or generally parallel to the title bar (i.e. "generally parallel" meaning within a predetermined angle of parallel).

In response to this detection at 420, at 430 the application window is enlarged in both the horizontal and vertical directions.

FIG. 6A shows one example of a re-sizing operation in accordance with blocks 400-430 of FIG. 5. In this example the enlargement is symmetrical in that the percentage enlargement in the vertical direction is equal to the percentage enlargement in the horizontal direction (i.e. the aspect ratio is maintained). First and second contacts 310 and 320 are in the title bar area 114a and relative movement of the contacts away from each other is detected. In response the application window 110a is enlarged and the resulting resized window is shown in FIG. 6B.

In some implementations the resizing may be about a corner of the window, in other implementations the resizing may be about a center of the window. In some implementations the top edge of the title bar may be kept stationary such that it expands horizontally only (e.g. in the direction parallel to the longest axis of the title bar); and the window expands vertically. In some implementations the title bar may expand horizontally in only one predefined direction (i.e. only to the left of only to the right) while the window scales symmetrically in the vertical direction in accordance with the horizontally resizing.

Alternatively, the contacts may be detected to move closer together (e.g. in a pinching gesture). At block 440 of FIG. 5 one or both of the first and second contacts is detected moving towards the other one of the first and second contacts. In response to this detection, at 440 the application window is made smaller both horizontally and vertically. FIG. 6C shows an example. The first and second contacts 310 and 320 are detected moving together in the title bar area 114a and in response the application window is made symmetrically smaller in both the vertical and horizontal directions. In the example of FIG. 6C the resizing is about the top left corner 113a, so that the edge 114 moves leftwards towards the corner 113a and the bottom edge 116 moves upwards towards the title bar 114a. The resized window is shown in FIG. 6D. In other implementations the resizing could be about another predetermined corner of the application window or about the center of the application window.

Figure 7:
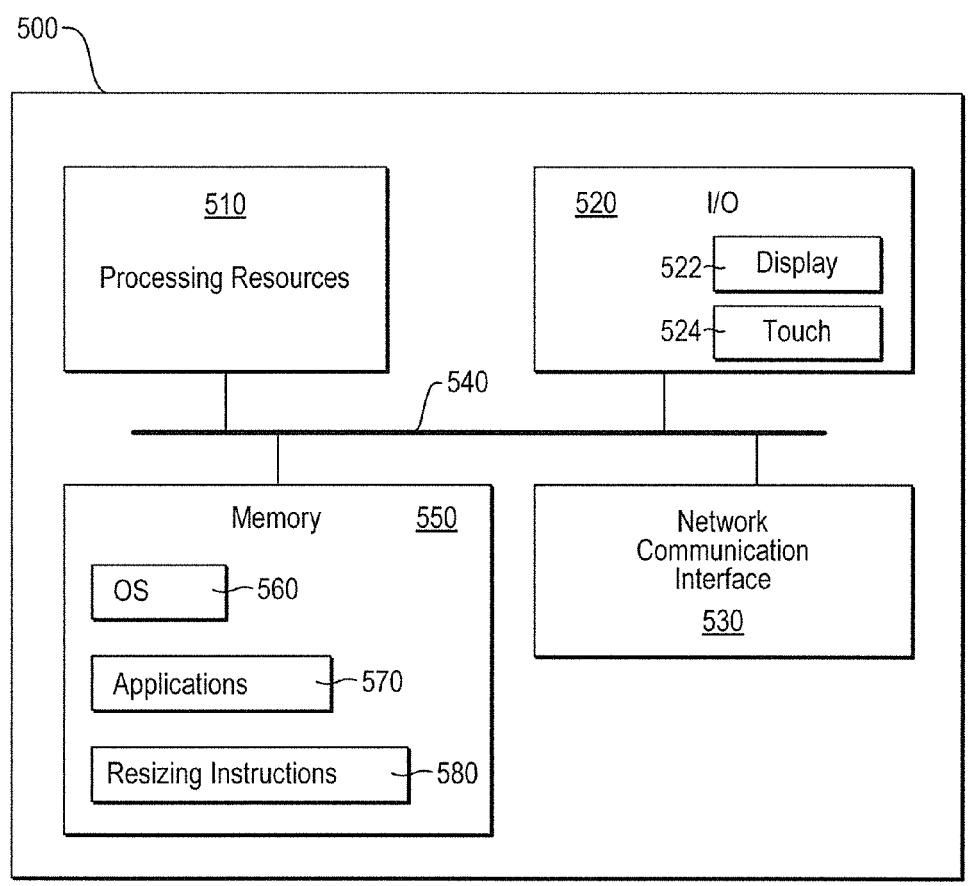
FIG. 7 is a schematic diagram of a computing device capable of implementing a method according to FIG. 2 or FIG. 5.

FIG. 7 is a schematic diagram showing an example of a computing device having a touch sensitive display and configured to implement a method of re-sizing a user interface object as described in the present disclosure. The computing device 500 comprises processing resources 510, an I/O module 520, a network communication interface 530 and memory 550 connected by a bus 540. The processing resources 510 may comprise one or more CPUs or other processors or logic circuitry. The I/O module comprises display circuitry 522 for driving the display and touch detection circuitry 524 for detecting contacts on the display. The network communications interface 530 comprises circuitry for facilitating communication over a network, e.g. a WLAN or wireless mobile network. Memory 550 may take the form of one or more non-transitory machine readable storage media, e.g. a volatile or non-volatile memory, hard disk drive, solid state storage, flash ROM etc. The memory 550 is referred to collectively for ease of reference but may include several discrete storage media. The memory stores an Operating System (OS) providing basic functionality and one or more application programs 570. More specifically these are stored as machine readable instructions which may be executed by the processing resources in order to implement the OS and/or application programs. The memory also stores data for use in the application programs or by the OS. The memory further stores a set of machine readable instructions 570 which may be executed by the processor to detect a gesture in which a first contact is stationary and a second contact moves relative to the first contact and to resize a user interface object on the display in response to detecting said gesture, as described above with reference to FIGS. 1 to 4. The memory may stores another set of machine readable instructions 580 which are executable to detect a resizing gesture in the title bar area of an application window and resize the window accordingly as described above and in FIGS. 5, 6A to 6D. The instructions 570 and 580 are shown separately from the application programs and OS for clarity and ease of identification, however in practice they may be provided as part of the OS, or as part of an application program or a combination thereof.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

What is claimed is:

1. A computing device comprising: a touch sensitive display, a processing resource, a memory storing machine readable instructions executable by the processing resource to:
    display an application window on the touch sensitive display, wherein the application window includes a resizable frame,
    detect a first physical contact on a surface of the touch sensitive display at a first location on the surface of the touch sensitive display,
    detect a second physical contact at a second location on the surface of the touch sensitive display,
    detect the second physical contact moving across the touch sensitive display while
    the first physical contact remains in contact with the touch sensitive display and substantially stationary, and
    re-size the frame of the application window, including moving a corner or edge of the frame, in accordance with a direction of the movement of the second physical contact, without zooming within the display and wherein said second location is an arbitrary location on the touch sensitive display.

2. The computing device according to claim 1, wherein said second location is a position within the application window.

3. The computing device according to claim 1, wherein said second location is a position within the application window, except for a title bar of said application window.

4. The computing device according to claim 1, wherein said second location is outside of the application window.

5. The computing device according to claim 1, wherein the instructions comprise instructions to keep another corner or edge of the frame stationary while the frame is re-sized.

6. The computing device of claim 1, wherein said frame of the application window has a vertical axis and a horizontal axis and wherein the instructions comprise instructions to resize the frame horizontally in the direction of movement of the second physical contact while retaining the same size in the vertical direction, if the detected movement of the second physical contact is along or within in a predetermined angle of the horizontal axis.

7. The computing device of claim 1, wherein said frame of the application window has a vertical axis and a horizontal axis and wherein the instructions comprise instructions to resize the frame vertically in the direction of movement of the second physical contact while retaining the same size in the horizontal direction, if the detected movement of the second physical contact is parallel with or within a predetermined angle of the vertical axis.

8. The computing device of claim 1, wherein said frame of the application window has a vertical axis and a horizontal axis and wherein the instructions comprise instructions to resize the frame both horizontally and vertically if the direction of movement of the second physical contact has at least a predetermined component in both the horizontal and vertical directions.

9. The computing device of claim 1, wherein said instructions are to increase the size of the frame of the application window when the second physical contact is detected to move away from the first physical contact.

10. The computing device of claim 1, wherein said instructions are to decrease the size of the frame of the application window when the second physical contact is detected to move towards the first physical contact.

11. A non-transitory computer readable medium storing instructions executable by a processor to:
    display an application window on a touch sensitive display, wherein the application window includes a resizable frame,
    detect first and second physical contacts at first and second locations on a surface of the touch sensitive display,
    detect the second physical contact moving across the touch sensitive display while the first physical contact remains in contact with the touch sensitive display and substantially stationary, and
    re-size the frame of the application window, including moving a corner or edge of the frame, in accordance with a direction of the movement of the second physical contact, while keeping another corner or edge of the frame stationary while the frame is re-sized and without changing magnification within the display.

12. The non-transitory computer readable medium of claim 11, wherein said stationary corner or edge is a corner or edge which is nearer to the first physical contact than the second physical contact.

13. The non-transitory computer readable medium of claim 11, wherein said instructions comprise instructions to re-size the frame of the application window when the first location is inside an outer boundary of the frame.

14. The non-transitory computer readable medium of claim 11, wherein said instructions comprise instructions to re-size the frame of application window asymmetrically based on the direction of movement of the second physical contact.

15. A computing device comprising:
    a touch sensitive display,
    a processing resource,
    a memory storing machine readable instructions executable by the processing resource to:
        display an application window on the touch sensitive display, wherein the application window includes a resizable frame,
        detect first and second physical contacts on a surface of said touch sensitive display at locations within a title bar of the application window,
        detect relative movement of at least one of said first and second physical contacts away from or towards the other of said first and second physical contacts, and
        re-size the frame of the application window symmetrically in horizontal and vertical directions in accordance with said detected movement without changing magnification within the display.

16. The computing device of claim 15, wherein the instructions are to re-size the frame of the application window when movement of both said first and second physical contacts is detected.

17. The computing device of claim 15, wherein the instructions are to reduce the size of the frame of the application window symmetrically in the horizontal and vertical directions when said detected relative movement brings the first and second physical contacts closer together.

18. The computing device of claim 15, wherein the instructions are to increase the size of the frame of the application window symmetrically in the horizontal and vertical directions when said detected relative movement brings the first and second physical contacts further apart.

19. The computing device of claim 15, wherein the instructions are to resize the frame of the application window symmetrically in the horizontal and vertical directions when movement of said first and second physical contacts towards each other is detected in a direction parallel with a horizontal axis of the title bar.

20. The computing device of claim 1, wherein a tool bar on the touch sensitive display and a pane of the application window are resizable.

\* \* \* \* \*